US012745001B2

(12) United States Patent
Sugaya

(10) Patent No.: US 12,745,001 B2
(45) Date of Patent: Sep. 22, 2026

(54) IMAGE PICKUP APPARATUS, LENS APPARATUS, AND CONTROL METHOD

(71) Applicant: CANON KABUSHIKI KAISHA, Tokyo (JP)

(72) Inventor: Tomohiro Sugaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 19/048,088

(22) Filed: Feb. 7, 2025

(65) Prior Publication Data

US 2025/0267364 A1 Aug. 21, 2025

(30) Foreign Application Priority Data

Feb. 21, 2024 (JP) ................................ 2024-024981

(51) Int. Cl.
*H04N 23/68* (2023.01)
*H04N 23/63* (2023.01)

(52) U.S. Cl.
CPC ....... *H04N 23/6812* (2023.01); *H04N 23/635* (2023.01); *H04N 23/683* (2023.01)

(58) Field of Classification Search
CPC ............. H04N 23/6812; H04N 23/635; H04N 23/683; H04N 23/663; H04N 23/6811; H04N 23/687
See application file for complete search history.

(56) References Cited

U.S. PATENT DOCUMENTS 7,791,641 B2 * 9/2010 Voronov ................ H04N 23/73 375/240.06
9,557,576 B2 * 1/2017 Takeuchi ............. G02B 27/646
9,813,627 B2 * 11/2017 Wakamatsu ......... H04N 23/687
10,498,962 B2 * 12/2019 Iso ........................... G06T 5/50
2007/0177037 A1 * 8/2007 Kurata ................. H04N 23/689 348/241
2009/0273688 A1 * 11/2009 Nonaka .................. H04N 23/69 348/222.1
2024/0179412 A1 * 5/2024 Nakata ............... H04N 23/6812

FOREIGN PATENT DOCUMENTS

JP 2018159957 A 10/2018

* cited by examiner

*Primary Examiner* — Hung H Lam
(74) *Attorney, Agent, or Firm* — Cowan, Liebowitz & Latman, P.C.

(57) ABSTRACT

An imaging apparatus to which a lens apparatus is detachably attached includes a first detector detecting shake applied to the imaging apparatus, a second detector detecting shake from an image, a first corrector performing image stabilization using output of at least one of the first and second detectors, a restrictor restricting use of the output of the second detector, and a setter setting a method for performing image stabilization. When the lens apparatus includes a second corrector performing image stabilization and the use of the output of the second detector is restricted, the setter selects the method with a higher correction effect between a first method, in which the first corrector performs image stabilization with a ratio greater than that of the second corrector, and a second method, in which the second corrector performs image stabilization with a ratio greater than that of the first corrector.

17 Claims, 8 Drawing Sheets

| | | EQUIPPED WITH LENS IMAGE STABILIZATION MEANS | | NOT EQUIPPED WITH LENS IMAGE STABILIZATION MEANS |
|---|---|---|---|---|
| | | IMAGE STABILIZATION EFFECT CAMERA < LENS | IMAGE STABILIZATION EFFECT LENS < CAMERA | |
| MOTION VECTOR USE | AVAILABLE | SECOND IMAGE STABILIZATION METHOD | | FIRST IMAGE STABILIZATION METHOD |
| | NOT AVAILABLE | THIRD IMAGE STABILIZATION METHOD | FOURTH IMAGE STABILIZATION METHOD | |

| | | EQUIPPED WITH LENS IMAGE STABILIZATION MEANS | | NOT EQUIPPED WITH LENS IMAGE STABILIZATION MEANS |
|---|---|---|---|---|
| | | IMAGE STABILIZATION EFFECT CAMERA < LENS | IMAGE STABILIZATION EFFECT LENS < CAMERA | |
| MOTION VECTOR USE | AVAILABLE | SECOND IMAGE STABILIZATION METHOD | SECOND IMAGE STABILIZATION METHOD | FIRST IMAGE STABILIZATION METHOD |
| | NOT AVAILABLE | THIRD IMAGE STABILIZATION METHOD | FOURTH IMAGE STABILIZATION METHOD | |

FIG. 2

IMAGE RECORDED IN FIRST CAMERA IMAGE STABILIZATION MODE

IMAGE RECORDED IN SECOND CAMERA IMAGE STABILIZATION MODE

CAPTURED IMAGE WHEN FACE AREA IS LARGE

CAPTURED IMAGE WHEN FACE AREA IS SMALL

IMAGE PICKUP APPARATUS, LENS APPARATUS, AND CONTROL METHOD

BACKGROUND

Technical Field

The present disclosure relates to an image pickup apparatus including a correcting unit that performs image stabilization and a lens apparatus.

Description of Related Art

It is known that an interchangeable lens camera corrects shake detected in an interchangeable lens by moving a correction lens provided in part of a lens group, and corrects residual shake, which cannot be corrected by the interchangeable lens and is detected using motion vectors in a camera body. However, when capturing a moving object, such as a person, an animal, or a vehicle, the motion vectors are affected by its movement, making it impossible to accurately detect the shake.

Japanese Patent Laid-Open No. 2018-159957 discloses a configuration that does not use motion vectors in shooting modes where a moving object is likely to be captured, namely, modes prone to erroneous motion vector detection.

However, in the camera described above, if use of motion vectors is stopped as in the configuration of Japanese Patent Laid-Open No. 2018-159957, the camera body will be unable to detect the residual shake, and since image stabilization cannot be performed, the overall image stabilization performance of the camera will be degraded.

SUMMARY

An image pickup apparatus according to one aspect of the present disclosure is designed to allow a lens apparatus to be attached and detached. The image pickup apparatus includes a first detector configured to detect shake applied to the image pickup apparatus, a second detector configured to detect shake from an image captured by an image sensor, and one or more processors that execute one or more programs stored in a memory and thereby function as: a first correcting unit configured to perform image stabilization using output of at least one of the first detector unit and the second detector, a restricting unit configured to restrict use of the output of the second detector, and a setting unit configured to set a method for performing image stabilization. When the lens apparatus includes a second correcting unit that performs image stabilization and the use of the output of the second detector for image stabilization is restricted, the setting unit selects the method with a higher correction effect between a first method, in which the first correcting unit performs image stabilization with a correction ratio greater than that of the second correcting unit, and a second method, in which the second correcting unit performs image stabilization with a correction ratio greater than that of the first correcting unit.

Further features of various embodiments of the disclosure will become apparent from the following description of exemplary embodiments with reference to the attached drawings.

BRIEF DESCRIPTION OF THE DRAWINGS

FIG. 2 illustrates a relationship between an image stabilization method and factors determining the image stabilization method.

DETAILED DESCRIPTION

Figure 1:
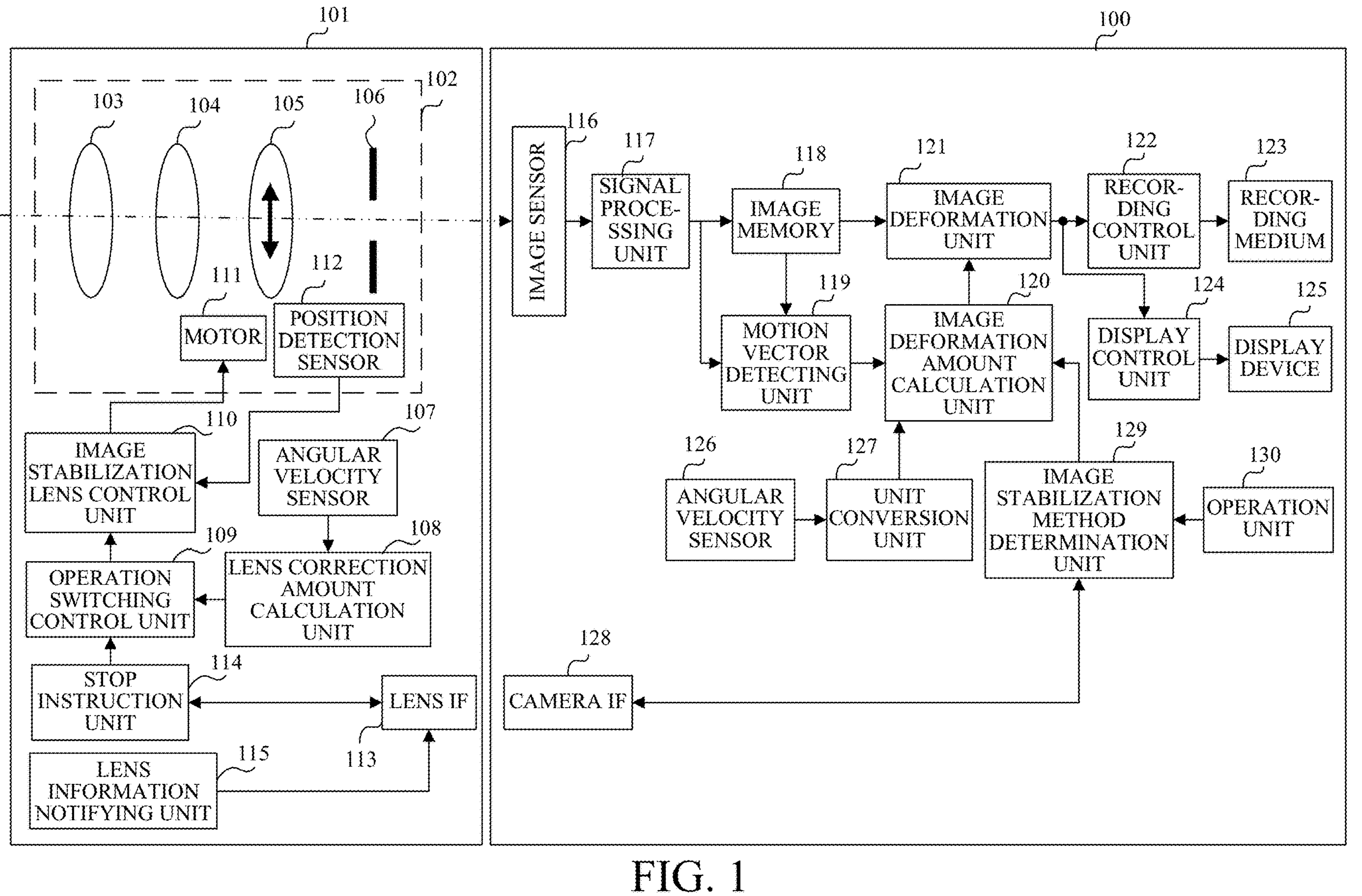
FIG. 1 illustrates an example configuration of a camera system according to first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 illustrates an example configuration of a camera system according to this embodiment. The camera system includes a camera (image pickup apparatus) 100 and an interchangeable lens (lens apparatus) 101. The camera 100 is an interchangeable lens camera to which the interchangeable lens 101 can be attached and detached. The interchangeable lens 101 is one of lenses that can be mounted on the camera 100.

The interchangeable lens 101 includes a lens unit 102 comprising a focus lens 103 for focus adjustment, a zoom lens 104 capable of changing a focal length, a shift lens (second correcting unit) 105 for image stabilization, and an aperture 106. The shift lens 105 can move in directions including components perpendicular to an optical axis and optically corrects image shake relative to the optical axis by moving in response to shake applied to the interchangeable lens 101. The interchangeable lens 101 is equipped with unillustrated ring operation members for operating the focus lens 103, the zoom lens 104, and the aperture 106. By operating the ring operation members, a photographer can change the focal length, focus on an object, and adjust exposure through the aperture. The focus lens 103 and the zoom lens 104 each include an unillustrated position detection encoder. This enables determination of a current position of each lens, facilitating calculation of an object distance and the focal length. The aperture 106 adjusts an aperture diameter by moving aperture blades using an unillustrated stepping motor. In this embodiment, information about the current aperture diameter can be acquired. For example, aperture diameter information can be obtained based on rotation angle information from a sensor detecting a rotation angle of the stepping motor. The imaging light flux from the object passes through the lens unit 102 and enters an image sensor 116 of the camera 100.

An angular velocity sensor (detector) 107 detects the shake applied to the interchangeable lens 101 as angular velocity and outputs a signal corresponding to the angular velocity. Instead of the angular velocity sensor 107, a sensor that detects acceleration or angular acceleration may be used to detect the shake. If the angular velocity sensor 107 is an analog sensor that changes an output voltage according to the detected angular velocity, the signal from the angular velocity sensor 107 is digitized via an A/D converter and sent to a lens correction amount calculation unit 108. If the angular velocity sensor 107 is a digital sensor, angular velocity information acquired as digital data by an unillustrated serial communication unit is sent to the lens correction amount calculation unit 108.

The lens correction amount calculation unit 108 calculates a target movement position of the shift lens 105 for performing image stabilization. The lens correction amount calculation unit 108 performs, for example, high-pass filter processing to remove a baseline shift of the output from the angular velocity sensor 107, and integration processing to calculate an angle from the angular velocity. Additionally, the lens correction amount calculation unit 108 performs unit conversion processing to match the unit of the position information of the shift lens 105 with angle unit information, as well as correction processing for the target movement position of the shift lens 105 according to the focal length and the object distance.

An operation switching control unit 109 outputs target movement position information of the shift lens 105 to an image stabilization lens control unit 110 to execute or stop an image stabilization function, in accordance with output of a stop instruction unit 114 described later. The operation switching control unit 109 transmits the output of the lens correction amount calculation unit 108 to the image stabilization lens control unit 110 when executing image stabilization, and outputs the target movement position to either fix the shift lens 105 at an optical axis center position or maintain its current position when stopping image stabilization. The image stabilization lens control unit 110 controls the movement of the shift lens 105 to a predetermined position by feedback control. The image stabilization lens control unit 110 calculates a difference between the target movement position acquired from the operation switching control unit 109 and the current position of the shift lens 105 obtained from a position detection sensor 112, and calculates a motor drive amount based on this difference. In addition to the difference calculation between the current position and the target movement position, the image stabilization lens control unit 110 performs amplification processing to amplify the calculated difference by a predetermined gain, and phase compensation filter processing to compensate for a phase of the amplified difference. The data output from the image stabilization lens control unit 110 is modulated into a PWM waveform by a pulse width modulator (not illustrated), which adjusts a duty cycle of a pulse wave, and is then supplied to a motor 111. The motor 111, which includes an H-bridge circuit and a voice coil motor, generates a driving force to move the shift lens 105 by applying a voltage to the terminals of the voice coil motor based on the PWM waveform, which causes the current flowing through the coil to change.

The position detection sensor 112 includes a magnet and a hall sensor provided at a position facing the magnet. When the shift lens 105 moves, the magnetic flux applied to the hall sensor changes, causing the output voltage from the hall sensor to vary. The position detection sensor 112 may include an operational amplifier circuit that amplifies the output of the hall sensor. The output of the position detection sensor 112 is input to the image stabilization lens control unit 110 via an A/D converter (not illustrated), and as described above, the image stabilization lens control unit 110 calculates the difference between the input from the position detection sensor 112 and the target position information, and recalculates the motor drive amount. In this manner, the feedback control is configured to continuously correct the difference between the current position and the target position.

A lens interface (lens IF) 113 performs serial communication with the camera 100 at predetermined timings via mount contacts, enabling data transmission to and data reception from the camera 100. The camera 100 can issue an image stabilization stop instruction to the interchangeable lens 101, and this stop instruction from the camera 100 is input to the stop instruction unit 114 via the lens IF 113. The interchangeable lens 101 may include a lock mechanism for fixing the shift lens 105 at a predetermined position. In this case, upon receiving the image stabilization stop instruction from the camera 100, the interchangeable lens 101 controls the lock mechanism via the stop instruction unit 114 to securely hold the shift lens 105 using the lock mechanism. The lock mechanism may also determine a stationary state based on the output of the angular velocity sensor 107 and lock the shift lens 105 based on the judgment of the interchangeable lens 101.

The image sensor 116, composed of CCD or CMOS elements, performs photoelectric conversion of the optical image formed by the lens unit 102. An image signal, representing the captured image composed of multiple pixels, undergoes predetermined signal processing in a signal processing unit 117. The signal processing unit 117 performs noise removal, gain adjustment, and AD conversion on the image signal read from the image sensor 116, converting it into digital data, and subsequently, executes image processing such as pixel interpolation and color conversion to generate image data for each frame. The image data for each frame is stored in an image memory 118. An image deformation unit 121 modifies a readout range or a readout position of individual pixels from the image memory 118. The image deformation unit 121 adjusts the readout range or the position of individual pixel from the image memory 118 in a manner that offsets positional shifts between images caused by the shake of the camera 100, thereby correcting inter-frame positional misalignment. In other words, the image deformation unit 121 functions as a correcting unit (first correcting unit) that implements electronic image stabilization by controlling the readout positions of the image. Video data output from the image deformation unit 121 is supplied to a recording control unit 122. The recording control unit 122 receives recording start and stop instructions from an operation unit 130 and, when video recording is instructed, converts the video data supplied from the image deformation unit 121 into a format suitable for recording on a recording medium 123 and records it on the recording medium 123. The output of the image deformation unit 121 is also supplied to a display control unit 124. The display control unit 124 drives a display device 125, which uses a liquid crystal display element (LCD) to display the image.

A motion vector detecting unit (second detector) 119 detects the motion vectors of the image based on the luminance signal included in the current video signal generated by the signal processing unit 117 and the luminance signal included in the video signal from one frame prior stored in the image memory 118. As a method for detecting the motion vector, a block matching method, for example, can be used. The block matching method divides the captured image into regions called blocks and detects similar areas between the current captured image and, for example, the captured image from one frame ago, on a block-by-block basis. For any range in the captured image from one frame ago, the location with the highest correlation value with any block in the current captured image is considered the similar block position. The displacement between any block position in the current captured image and the similar block position in the captured image from one frame ago is calculated, and the motion information between frames of the captured image, i.e., the motion vector, is detected.

Additionally, in the motion vector detecting unit 119, a representative motion vector for the entire captured image is determined from the motion vectors of each block. As a method for calculating the representative motion vector, for example, a histogram (frequency distribution) showing the frequency (occurrence) of the magnitudes (classes) of the motion vectors for each block can be generated, and the motion vector with the highest frequency is selected as the representative motion vector. In the following explanation, the term 'motion vector' refers to the representative motion vector.

An image deformation amount calculation unit 120 determines the amount of image deformation, such as the readout position from the image memory 118, in order to correct the displacement of the object position between frames based on the input motion vector, and the image deformation unit 121 applies the deformation processing to the image based on that deformation amount.

A camera IF 128, like the lens IF 113, performs serial communication with the interchangeable lens 101 at a predetermined timing through the mount contacts, transmitting data to the interchangeable lens 101 and receiving data from it. An image stabilization method determination unit (setting unit) 129 acquires information from the interchangeable lens 101 and determines (sets) an image stabilization method. Specifically, it obtains information about whether the currently attached interchangeable lens 101 has image stabilization means, and if it does, such as a shift lens 105, the camera 100 calculates the amount of image deformation based on the output from the motion vector detecting unit 119. This allows the residual shake after image stabilization by the shift lens 105 to be detected using the motion vector. If the interchangeable lens 101 does not have image stabilization means, the camera 100 uses an angular velocity sensor (first detector) 126 to perform image stabilization. The angular velocity sensor 126 detects the shake applied to the camera 100 as angular velocity and outputs a signal corresponding to the angular velocity. Alternatively, a sensor that detects angular acceleration or acceleration can be used instead of the angular velocity sensor 126. The output of the angular velocity sensor 126 is converted from angular velocity units to pixel units, as output by the motion vector detecting unit 119, by a unit conversion unit 127. A high-pass filter operation to remove the offset in the output of the angular velocity sensor 107 is also performed in this process. The operation unit 130 is a user interface that allows the photographer to perform various menu operations and mode switching operations. As mentioned earlier, the operation unit 130 can also be used to select whether or not to use motion vectors in image stabilization. In other words, the operation unit 130 functions as a restricting unit that restricts the use of motion vectors.

Here, when the photographer selects whether or not to use motion vectors for image stabilization, the camera 100 switches the image stabilization method based on the presence or absence of the image stabilization function in the attached interchangeable lens 101. The following describes the image stabilization methods for these combinations. FIG. 2 illustrates a relationship between the image stabilization method and factors that determine the image stabilization method. If the attached interchangeable lens 101 does not have image stabilization means such as a shift lens 105, the camera 100 performs image stabilization on its own. In this case, electronic image stabilization is performed by the image deformation amount calculation unit 120 based on the shake detected by the angular velocity sensor 126. This method is referred to as a first image stabilization method.

If the attached interchangeable lens 101 has image stabilization means, the image stabilization method will vary depending on whether the photographer selects the use of motion vectors. If the photographer chooses to use motion vectors, the interchangeable lens 101 detects shake using the angular velocity sensor 107 and performs image stabilization with the shift lens 105. The camera 100 detects the residual image stabilization effect from the shift lens 105 using the motion vector detecting unit 119 and calculates the image deformation amount based on this. In this case, the angular velocity sensor 126 is not used. This method is referred to as a second image stabilization method. If the interchangeable lens 101 has image stabilization means and the photographer chooses not to use motion vectors, the method is determined based on the magnitude (height) of the image stabilization effect between the camera 100 side and the interchangeable lens 101 side. In this embodiment, the magnitude of the image stabilization effect refers to the achievable angle of image stabilization. However, other factors, such as the resolution in image stabilization control or the movable frequency bandwidth of the image stabilization means, may also be considered to determine the magnitude of the image stabilization effect.

If the image stabilization effect on the interchangeable lens 101 side is greater, the interchangeable lens 101 performs image stabilization using the shift lens 105, similar to the second image stabilization method, but the camera 100 will stop image stabilization. This method is referred to as a third image stabilization method (second method). Examples of methods to stop image stabilization on the camera 100 side include outputting a signal from the image deformation amount calculation unit 120 to prevent image deformation, or ensuring that no deformation is applied to the image output from the image memory 118 regardless of the deformation amount obtained by the image deformation unit 121. Additionally, a method to stop the output from the motion vector detecting unit 119 and the unit conversion unit 127, thereby invalidating the image deformation amount, is also possible.

If the image stabilization effect on the camera 100 side is greater, the camera 100 will use the angular velocity sensor 126, similar to the first image stabilization method, and perform image stabilization without using the output from the motion vector detecting unit 119. Additionally, the camera 100 will send a stop instruction for image stabilization to the interchangeable lens 101, thereby stopping the image stabilization of the interchangeable lens 101. This method is referred to as a fourth image stabilization method (first method). In the fourth image stabilization method, although image stabilization is performed only by the camera 100, similar to the first image stabilization method, it differs from the first method in that the camera 100 explicitly instructs the interchangeable lens 101 to stop its image stabilization.

If the attached interchangeable lens 101 does not have image stabilization means, the first image stabilization method is used in this embodiment, but even in this case, the processing can be changed based on the photographer's selection of whether to use the motion vector. For example, the photographer can choose whether to use the motion vector for correcting the baseline drift of the angular velocity sensor 126. Typically, the angular velocity sensor 126 may experience baseline drift, where the output at rest (when no angular velocity is applied) does not return to zero. As mentioned earlier, the baseline drift can be attenuated using a high-pass filter, or the drift amount can be estimated based on the motion vector, and the estimated drift amount can be subtracted or added to the output from the angular velocity sensor 126 for correction. The use of the motion vector for baseline drift estimation in the angular velocity sensor 126 can be linked to the photographer's choice of whether to use the motion vector.

Figure 3:
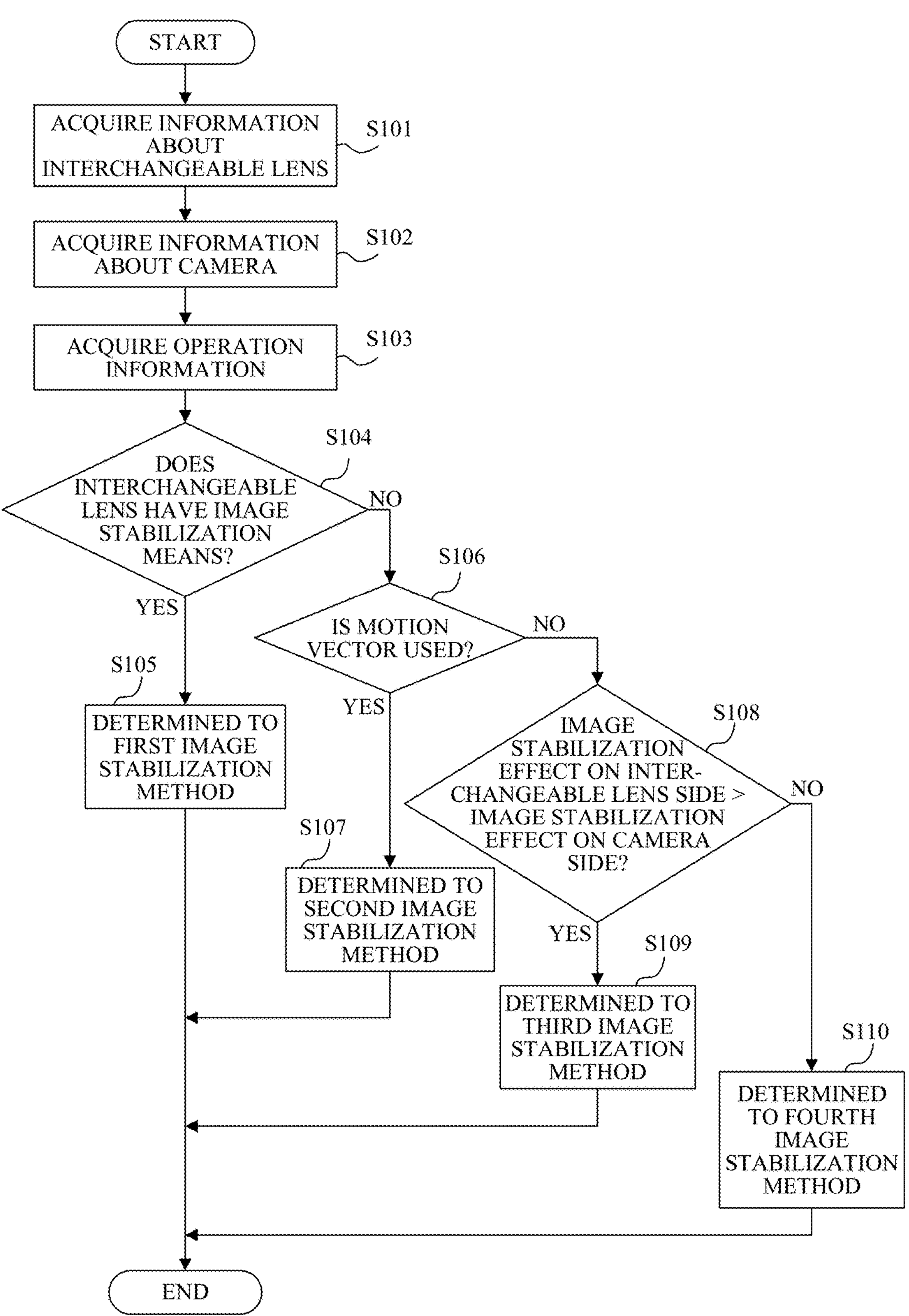
FIG. 3 is a flowchart illustrating processing performed by an image stabilization method determination unit.

Below, a flow of switching process for the first through fourth image stabilization methods will be explained. FIG. 3 is a flowchart illustrating the process performed by the image stabilization method determination unit 129. The flow in FIG. 3 may be started in synchronization with the frame rate, or it may be triggered in conjunction with communication with the interchangeable lens 101 or the photographer's operations on the operation unit 130.

In step S101, the image stabilization method determination unit 129 acquires information about the interchangeable lens 101 from a lens information notifying unit 115 via the camera IF 128. The information acquired includes whether the interchangeable lens 101 has image stabilization means and the information about the image stabilization possible angle of the shift lens 105.

In step S102, the image stabilization method determination unit 129 acquires information about the camera 100. The image stabilization method determination unit 129 obtains the image stabilization possible angle information for the camera 100 from an unillustrated camera memory, which stores various data such as parameters used for control in the camera 100.

In step S103, the image stabilization method determination unit 129 acquires information (operation information) from the operation unit 130. The information from the operation unit 130 indicates whether or not the motion vector will be used for image stabilization. If the photographer has not performed menu operations after purchasing the camera 100, the initial value of the camera 100 is acquired. The initial value is set to either the use or non-use of the motion vector. Additionally, the photographer's menu operations are stored in the aforementioned camera memory, and the previous operation information is retained when the camera is restarted.

In step S104, the image stabilization method determination unit 129 determines whether the interchangeable lens 101 has image stabilization means. If the image stabilization method determination unit 129 determines that the interchangeable lens 101 has image stabilization means, it executes the process in step S105; otherwise, it executes the process in step S107.

In step S105, the image stabilization method determination unit 129 determines the image stabilization method as the first image stabilization method.

In step S106, the image stabilization method determination unit 129 determines whether to use the motion vector. If the image stabilization method determination unit 129 determines to use the motion vector, it executes the process in step S107; otherwise, it executes the process in step S108.

In step S107, the image stabilization method determination unit 129 determines the image stabilization method as the second image stabilization method.

In step S108, the image stabilization method determination unit 129 determines whether the image stabilization effect on the interchangeable lens 101 side is greater than the image stabilization effect on the camera 100 side. If the image stabilization method determination unit 129 determines that the image stabilization effect on the interchangeable lens 101 side is greater, it executes the process in step S109; otherwise, it executes the process in step S110. If the image stabilization effect on the interchangeable lens 101 side is equal to the effect on the camera 100 side, either step can be executed according to a selectable setting.

In step S109, the image stabilization method determination unit 129 determines the image stabilization method as the third image stabilization method.

In step S110, the image stabilization method determination unit 129 determines the image stabilization method as the fourth image stabilization method.

After this flow ends, as mentioned earlier, the process in step S101 is executed again, triggered by the timing of generating the next frame image or by the photographer's operation.

The method for determining the image stabilization method is not limited to the method described in FIG. 3. As an example, a method for determining the image stabilization system will be explained for a case where the camera 100 is equipped with two camera image stabilization modes with different stabilization effects. Here, the mode with a lower stabilization effect is defined as a first camera image stabilization mode, and the mode with a higher stabilization effect is defined as a second camera image stabilization mode. The camera 100 changes the cropping range within the image and adjusts a surplus area for stabilization depending on the selected camera image stabilization mode. The camera image stabilization mode can be selected by the photographer via the operation unit 130.

Figure 4A:
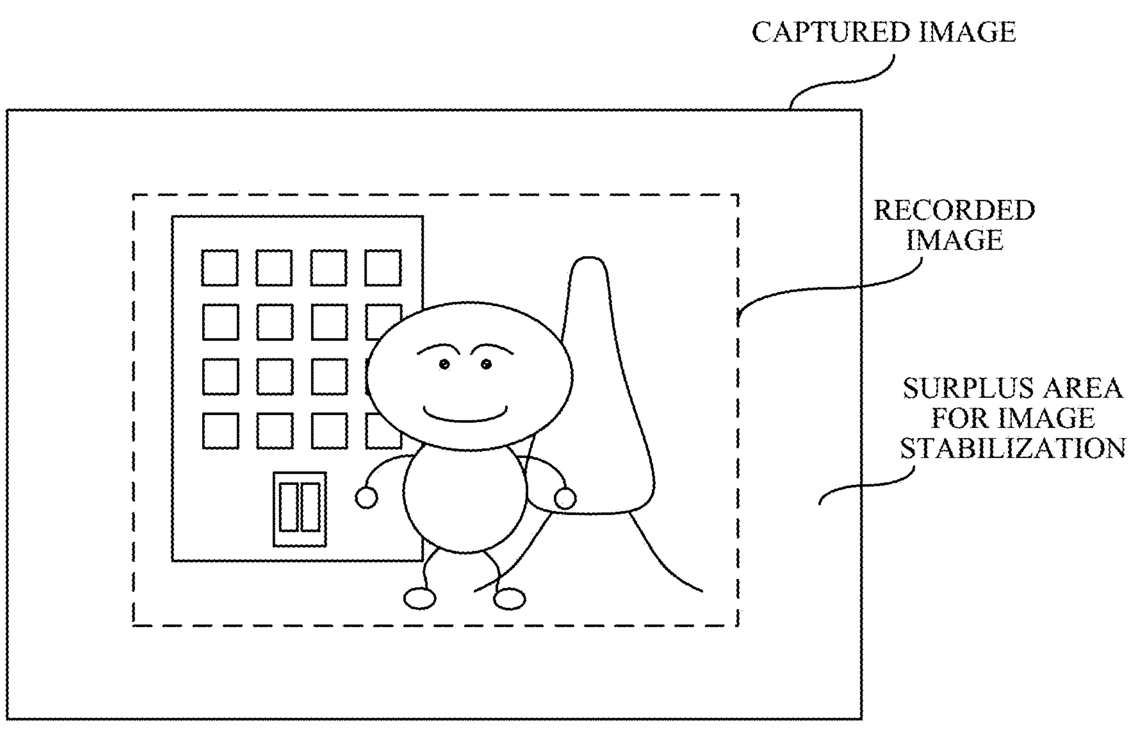
FIGS. 4A, 4B, 4C, and 4D are explanatory diagrams of camera image stabilization modes.
Figure 4B:
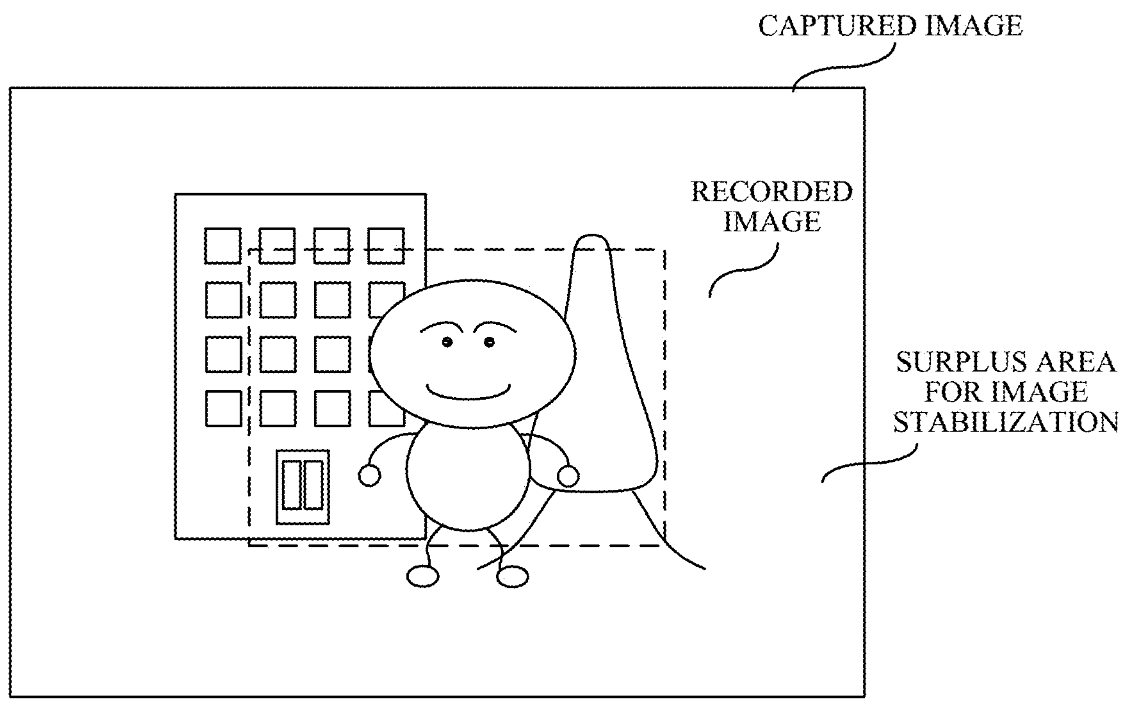

FIGS. 4A, 4B, 4C, and 4D are explanatory diagrams of the camera image stabilization modes. FIG. 4A illustrates the captured image, the recorded image, and the surplus area for image stabilization in the first camera image stabilization mode. FIG. 4B illustrates the captured image, the recorded image, and the surplus area for image stabilization in the second camera image stabilization mode. In the second camera image stabilization mode, the recorded image range is smaller compared to the first camera image stabilization mode, resulting in a larger surplus area for image stabilization. The larger the surplus area, the greater the possible adjustment of the cropping position, allowing for the correction of larger angular deviations as the surplus area increases.

Figure 4C:
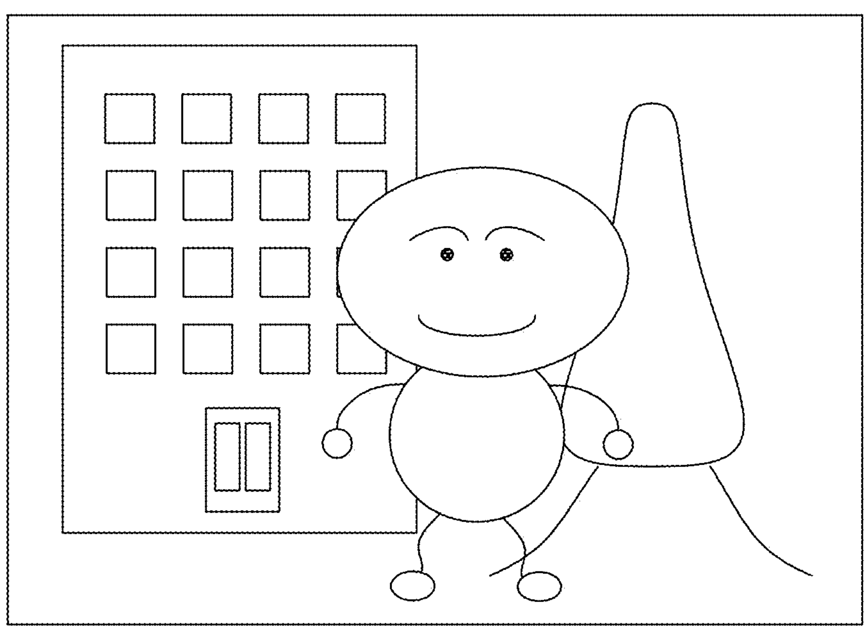
Figure 4D:
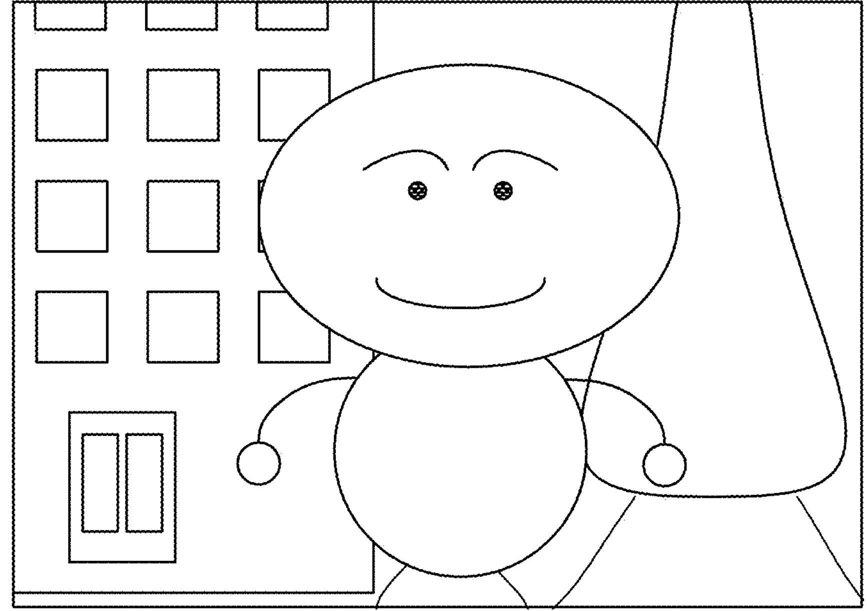

The recorded images shown in FIGS. 4A and 4B, as illustrated in FIGS. 4C and 4D, are stored in the recording medium and displayed on the display device 125. The recorded image in the first camera image stabilization mode is a wider-angle image compared to that in the second camera image stabilization mode. In other words, the first camera image stabilization mode enables shooting at a wider angle with a smaller image stabilization effect, while the second camera image stabilization mode provides a narrower field of view (telephoto) with a greater image stabilization effect. Here, the image stabilization angle of the interchangeable lens 101 is assumed to be larger than that in the first camera image stabilization mode but smaller than that in the second camera image stabilization mode. When the relationship of image stabilization effects between the camera image stabilization modes and the interchangeable lens 101 is predetermined in this manner, the image stabilization method determination unit 129 can omit acquiring information about the image stabilization angle of the interchangeable lens 101. Meanwhile, the operation unit 130 acquires not only information on whether to use motion vectors but also information on the selection of the camera image stabilization mode made by the photographer. Although the image stabilization method determination process itself follows the flow shown in FIG. 3, if the first camera image stabilization mode is selected in step S108, the process in step S109 is executed. If the second camera image stabilization mode is selected, the process in step S110 is executed. Thus, when the camera 100 is equipped with multiple correction modes with different image stabilization effects and the relationship of image stabilization effects between the interchangeable lens 101 and the camera 100 is predetermined according to the selected mode, the image stabilization method may be determined based on the camera image stabilization mode.

Moreover, the methods for each image stabilization mode when motion vectors are not used are not limited to the aforementioned examples. In the third image stabilization mode, the method of stopping image stabilization in the camera 100 was explained, while in the fourth image stabilization mode, the method of stopping image stabilization in the interchangeable lens 101 was described, but it is also possible to adopt a method where the correction amounts are distributed between the camera 100 and the interchangeable lens 101. For example, in the fourth image stabilization mode, if the detected shake angle exceeds the image stabilization angle of the camera 100, the interchangeable lens 101 may be assigned a portion of the image stabilization task. The image stabilization method determination unit 129 determines the distribution ratio (correction ratio) for each based on the ratio of the image stabilization angles of the camera 100 and the interchangeable lens 101 and notifies the interchangeable lens 101 of the distribution ratio. The interchangeable lens 101 calculates the correction amount by applying a predetermined gain to the output of the angular velocity sensor 107 in accordance with the distribution ratio using the lens correction amount calculation unit 108, and the camera 100 calculates the correction amount by applying a gain to the output of the angular velocity sensor 126 in accordance with the distribution ratio using the unit conversion unit 127. In addition, in the third image stabilization mode, the correction ratio of the image stabilization in the interchangeable lens 101 may be increased, and the correction ratio of the image stabilization in the camera 100 may be decreased compared to the fourth image stabilization mode. Furthermore, in the second image stabilization mode, a method that distributes the correction amounts between the camera 100 and the interchangeable lens 101 based on the correction ratio may also be used. In such a case, the third image stabilization mode may have a higher correction ratio for the image stabilization in the interchangeable lens 101 and a lower correction ratio for the image stabilization in the camera 100 compared to the second image stabilization mode. Additionally, in the fourth image stabilization mode, the correction ratio for the image stabilization in the interchangeable lens 101 may be reduced, and the correction ratio for the image stabilization in the camera 100 may be increased compared to the second image stabilization mode.

As described above, according to the configuration of the present embodiment, when the photographer wishes to disable the use of motion vectors, the image stabilization method is determined based on the image stabilization effects of the camera 100 and the interchangeable lens 101. This makes it possible to provide the photographer with a higher-quality image stabilization function.

In the present embodiment, the interchangeable lens 101 performs optical image stabilization using the shift lens 105, and the camera 200 performs electronic image stabilization, but other image stabilization methods may also be employed. For example, the image sensor 116 may be mounted on a movable stage, and its position may be adjusted based on the detected shake. In this case, the image sensor 116 may function as a first correcting unit. Additionally, in a configuration where the camera 200 is capable of performing both electronic image stabilization and image stabilization by adjusting the position of the image sensor 116 (in-camera optical image stabilization), both methods may be executed simultaneously during electronic image stabilization. In such a case, the image stabilization method determination unit 129 may determine the distribution ratio based on the correction angles achievable by the electronic image stabilization and the in-camera optical image stabilization, respectively.

Second Embodiment

Figure 5:
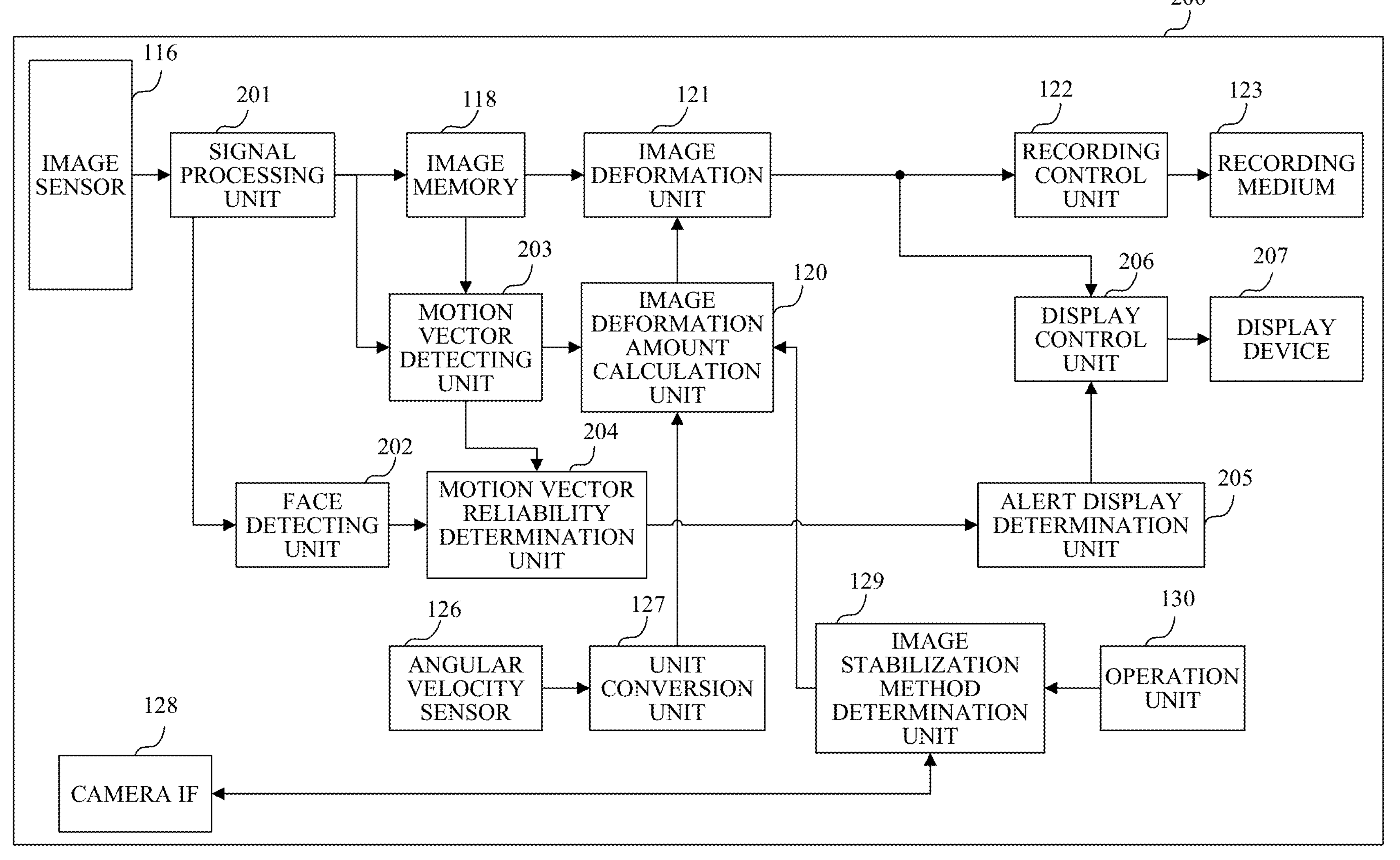
FIG. 5 illustrates an example configuration of a camera system according to second embodiment.

FIG. 5 illustrates an example configuration of the camera 200 according to the present embodiment. Unlike the camera 100 of the first embodiment, the camera 200 includes a function that prompts the photographer to select whether to disable the use of motion vectors when there is a possibility of motion vector misdetection. Specifically, since motion vector misdetection is more likely to occur when a person is prominently captured in the frame, the camera displays an icon or similar notification on the display device, indicating a high likelihood of motion vector misdetection based on the detected face size. For components of the camera 200 that are identical to those of the camera 100, the same reference numerals are used, and their detailed descriptions are omitted.

A signal processing unit 201 also outputs the video signal to a face detecting unit 202. The face detecting unit 202 outputs the results of determining whether a face is present in the video, and if a face is detected, it provides information on the size of the face area and the face's position. Face detection is performed using a matching determination process between a template representing the arrangement of facial features such as eyes, nose, and mouth, and the image.

A motion vector detecting unit 203 also outputs motion vector information to a motion vector reliability determination unit 204. Similar to the motion vector detecting unit 119, the motion vector detecting unit 203 determines a representative motion vector for the entire captured image based on the motion vectors of individual blocks. The representative motion vector is output to the image deformation amount calculation unit 120, while the motion vector information for each block is output to the motion vector reliability determination unit 204. The motion vector reliability determination unit 204 evaluates the reliability of the motion vector based on face information and motion vector information.

An alert display determination unit (notifying unit) 205 determines whether to issue an alert display based on the reliability of the motion vector. The display control unit 206 generates data for displaying a warning icon or similar notification on the display device 207, based on the output of the alert display determination unit 205. The display device 207 overlays and displays the alert display icon or similar notification on the video.

Figure 6A:
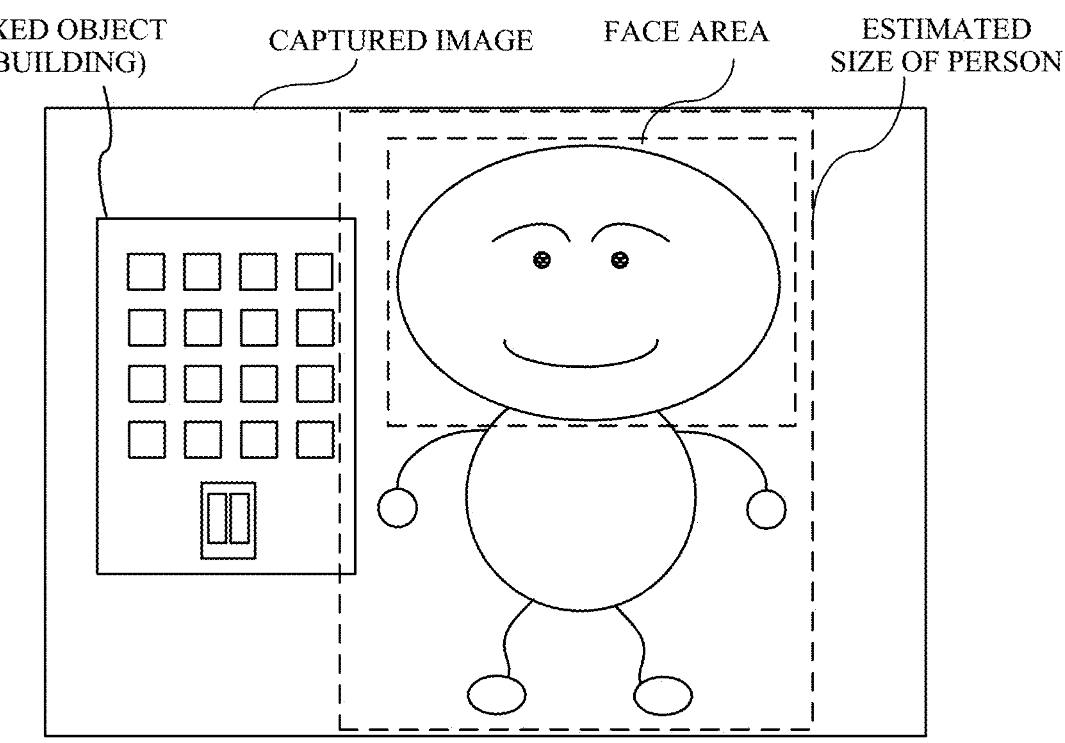
FIGS. 6A, 6B, 6C, and 6D illustrate histogram processing results of a face area and motion vector.
Figure 6B:
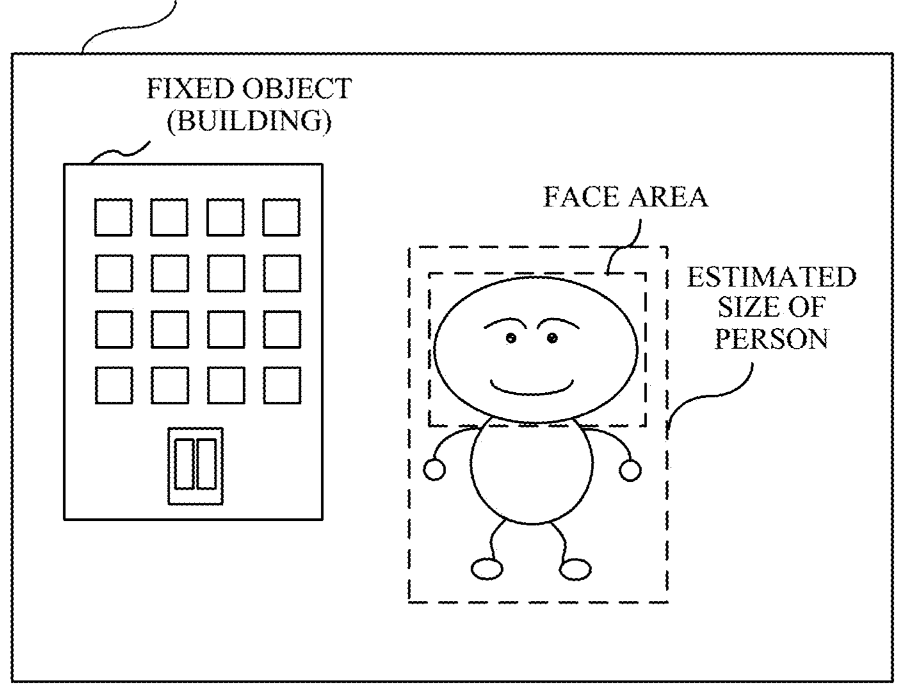
Figure 6C:
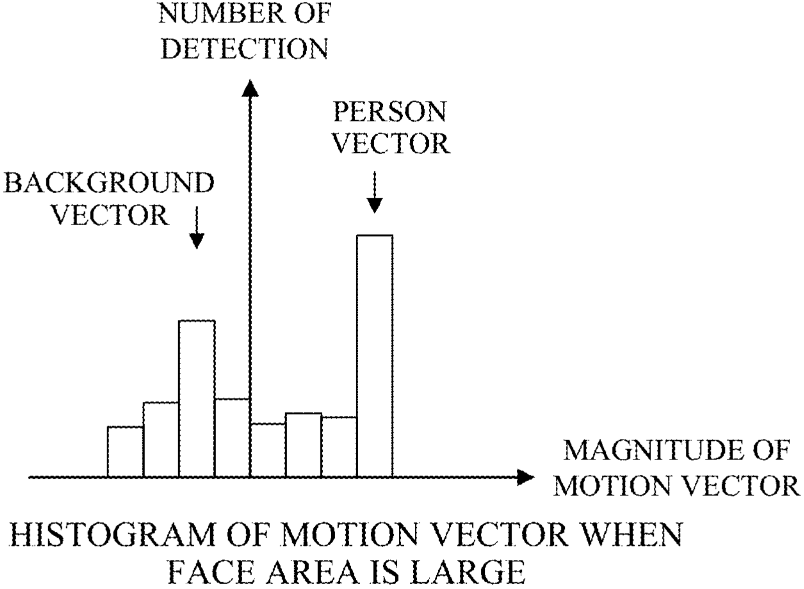
Figure 6D:
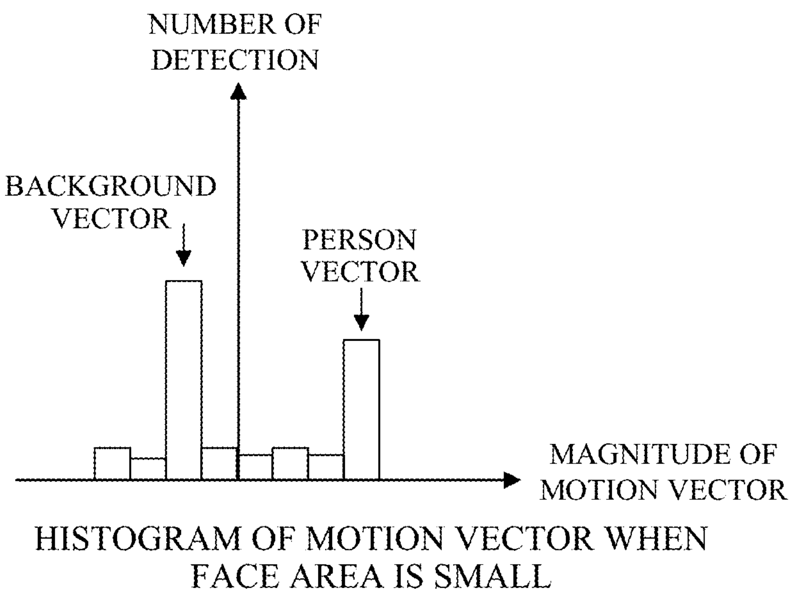

The following explains the determination process of the motion vector reliability determination unit 204. FIGS. 6A, 6B, 6C, and 6D illustrate the results of histogram processing for the face area and motion vector. FIG. 6A illustrates an image where the object (person) is captured large. FIG. 6B illustrates an image where the person is captured small. FIG. 6C represents the histogram of motion vectors detected in each block of the image from FIG. 6A. FIG. 6D represents the histogram of motion vectors detected in each block of the image from FIG. 6B. The histograms in FIGS. 6C and 6D have the vertical axis representing frequency and the horizontal axis representing class. Here, frequency refers to the number of motion vector detections, and the class refers to the magnitude of the motion vector. In FIG. 6C, since the person occupies a larger portion of the screen than fixed objects like buildings, motion vectors related to the person's movement (hereafter referred to as person vectors) are detected in more blocks than the motion vectors for the fixed objects (hereafter referred to as background vectors). In FIG. 6D, background vectors are detected in more blocks than person vectors. If the method of determining the representative motion vector is based on the highest number of detections, in FIG. 6C, the person motion vector would be selected as the representative motion vector. In this case, the person vector would be input as the representative motion vector into the image deformation amount calculation unit 120. Based on this information, if electronic image stabilization is performed, the cropping position would change according to the movement of the person, causing the image stabilization to not function correctly. In other words, as illustrated in FIG. 6A, using the representative motion vector determined from an image where the person is captured large for image stabilization is not desirable. To avoid such a situation, the motion vector reliability determination unit 204 sets the reliability of the representative motion vector for the image in FIG. 6A to a low value.

As a method for determining the reliability of motion vectors, one approach is to estimate the proportion of the person in the captured image and compare it with the proportion of fixed objects. The motion vector reliability determination unit 204 estimates the size of the body based on the size of the face area and calculates the estimated size of the entire person. The size of the body can be estimated by multiplying the size of the face area by a predetermined coefficient. The face detecting unit 202 classifies the person as an adult or child based on the arrangement of the eyes, nose, and mouth within the face area, and may have different coefficients for body size estimation depending on the classification. In the case of a profile view, the face area may be detected as smaller than when facing forward. In this case, the body size can be estimated by first converting the size of the face area to an equivalent size for a frontal view, and then performing the body size estimation. If the estimated size of the person, as calculated in this manner, occupies more than half of the captured image, the reliability of the motion vector is considered low. For example, in the case of the person's estimated size occupying more than half of the captured image, as illustrated in FIG. 6A, the reliability value of the motion vector is output from the motion vector reliability determination unit 204 as being below a predetermined threshold. The alert display determination unit 205 decides to display an alert if the reliability value is below the predetermined threshold.

The method for determining the reliability of motion vectors in the motion vector reliability determination unit 204 is not limited to the previously described approach. If the motion vector detecting unit 203 is capable of determining the presence of buildings based on features of the captured image, the reliability of the motion vector may be determined by comparing the sizes of the person and the building. Buildings can be identified by binarizing the pixels in the captured image to calculate the edges of objects in the image, and then determining whether the edges exhibit a high degree of linearity, which would indicate an artificial structure. In the captured images of FIGS. 6A and 6B, if areas other than the person and the building show regions such as the sky or ground (e.g., concrete), these areas tend to have low contrast, making it difficult to identify similar points during block matching. If block matching cannot be performed, the motion vector detecting unit 203 outputs motion vector detection error information for that block. The motion vector reliability determination unit 204 compares the size of the area estimated to be the person with the size of the area estimated to be the building, excluding the areas where motion vector detection errors were output from the captured image.

The following explains other determination methods in the motion vector reliability determination unit 204. The camera 200 is assumed to have an interchangeable lens 101 mounted, and the reliability is determined based on the depth of field information. The interchangeable lens 101 can calculate the focal length, the object distance, and the aperture diameter, and the alert display determination unit 205 can acquire this information via the lens interface 113 and the camera interface 128. The alert display determination unit 205 calculates the depth of field information from the focal length, the object distance, and the aperture diameter. If the depth of field is shallow, a warning is output. When the focus is set on a person and the depth of field is shallow, areas other than the person may be blurred, increasing the likelihood that the motion vector cannot be detected. In this case, since there is a high possibility of motion vector detection errors, the reliability of the motion vector may be determined by excluding the regions with motion vector detection errors, as described earlier, or directly by evaluating the reliability based on the depth of field information.

In this embodiment, the possibility of motion vector misdetection is determined by the camera 200, and the judgment result is notified to the photographer, enabling more appropriate operation of the camera 200.

In this embodiment, the motion vector reliability determination unit 204 determines the reliability of the motion vector using the region of the person included in the captured image, but the present disclosure is not limited to this. The camera 100 may be equipped with means to detect regions of other moving objects, such as animals or vehicles, included in the captured image, and the reliability may be determined using the regions of the moving objects detected in the captured image.

In this embodiment, the alert display determination unit 205 determines whether to display an alert based on the reliability of the motion vector, but the present disclosure is not limited to this. The alert display may be triggered if the size of the moving object's region coincides with the region of high motion vector reliability in the captured image. Here, "coincidence" includes not only exact matches but also substantial matches.

In each embodiment, the photographer's operation of the camera to stop the motion vector has been explained, but the present disclosure is not limited to this. For example, based on the result of the motion vector reliability determination, the camera may automatically switch to a control mode where the motion vector is not used. In this case, the camera functions as a restricting unit that limits the use of the motion vector.

While the disclosure has described example embodiments, it is to be understood that the disclosure is not limited to the example embodiments. The scope of the following claims is to be accorded the broadest interpretation so as to encompass all such modifications and equivalent structures and functions.

According to the present disclosure, image stabilization can be properly performed even when the motion vector is not used for shake detection.

This application claims priority to Japanese Patent Application No. 2024-024981, which was filed on Feb. 21, 2024, and which is hereby incorporated by reference herein in its entirety.

What is claimed is:

1. An image pickup apparatus to which a lens apparatus is attachable and detachable, the image pickup apparatus comprising:

a first detector configured to detect shake applied to the image pickup apparatus;

a second detector configured to detect shake from an image captured by an image sensor; and one or more processors that execute one or more programs stored in a memory and thereby function as:

a first correcting unit configured to perform image stabilization using output of at least one of the first detector and the second detector, a restricting unit configured to restrict use of the output of the second detector, and a setting unit configured to set a method for performing image stabilization, wherein, when the lens apparatus includes a second correcting unit that performs image stabilization and the use of the output of the second detector for image stabilization is restricted, the setting unit selects the method with a higher correction effect between a first method, in which the first correcting unit performs image stabilization with a correction ratio greater than that of the second correcting unit, and a second method, in which the second correcting unit performs image stabilization with a correction ratio greater than that of the first correcting unit.

2. The image pickup apparatus according to claim 1, wherein, in the first method, the first correcting unit performs image stabilization using the output of the first detector, and wherein, in the second method, the second correcting unit performs image stabilization based on output of a detector provided in the lens apparatus, which detects shake applied to the lens apparatus.

3. The image pickup apparatus according to claim 1, wherein the correction effect is an angle that can be compensated for image stabilization.

4. The image pickup apparatus according to claim 1, wherein, in the first method, the first correcting unit performs image stabilization, and the second correcting unit does not perform image stabilization.

5. The image pickup apparatus according to claim 1, wherein the restricting unit restricts the use of the output of the second detector according to photographer's instructions.

6. The image pickup apparatus according to claim 1, wherein the first correcting unit performs electronic image stabilization to control a readout position of the image using the output of at least one of the first detector and the second detector.

7. The image pickup apparatus according to claim 1, wherein the first correcting unit performs image stabilization by moving the image sensor using the output of at least one of the first detector and the second detector.

8. The image pickup apparatus according to claim 1, further comprising a notifying unit configured to provide a notification prompting a restriction of the use of the output of the second detector according to a region of a moving object within the image.

9. The image pickup apparatus according to claim 8, wherein the notifying unit provides the notification when a ratio of a size of the region of the moving object to a size of the image exceeds a predetermined value.

10. The image pickup apparatus according to claim 8, wherein the notifying unit provides the notification when a size of the region of the moving object matches a region in the image where a motion vector has high reliability.

11. The image pickup apparatus according to claim 8, wherein the notifying unit provides the notification when a depth of field is smaller than a predetermined value.

12. A lens apparatus that is attachable to and detachable from an image pickup apparatus, the lens apparatus comprising:

a first detector configured to detect shake applied to the lens apparatus; and one or more processors that execute one or more programs stored in a memory and thereby function as:

a correcting unit configured to perform image stabilization using output of at least one of the first detector and a second detector that detects shake from an image captured by an image sensor, wherein, when use of the output of the second detector for image stabilization is restricted, the correcting unit adjusts whether to perform image stabilization based on a correction effect of the correcting unit.

13. A lens apparatus that is attachable to and detachable from an image pickup apparatus, the lens apparatus comprising:

a first detector configured to detect shake applied to the lens apparatus; and one or more processors that execute one or more programs stored in a memory and thereby function as:

a correcting unit configured to perform image stabilization using output of at least one of the first detector and a second detector that detects shake from an image captured by an image sensor, wherein the correcting unit adjusts a correction ratio of the correcting unit based on whether use of the output of the second detector for image stabilization is restricted.

14. The lens apparatus according to claim 13, wherein the correcting unit adjusts a correction ratio of the correcting unit based on whether use of the output of the second detector for image stabilization is restricted and a correction effect of the correcting unit.

15. A control method of an image pickup apparatus to which a lens apparatus is attachable and detachable, the control method comprising:

a correcting step for performing image stabilization using output of at least one of a first detector that detects shake applied to the image pickup apparatus and a second detector that detects shake from an image captured by an image sensor;

a restricting step for restricting use of the output of the second detector; and a setting step for setting a method for performing image stabilization, wherein, in the setting step, when the use of the output of the second detector for image stabilization is restricted, the method with a higher correction effect is selected between a first method, in which a first correcting unit, provided in the image pickup apparatus for image stabilization, performs image stabilization with a correction ratio greater than that of a second correcting unit, provided in the lens apparatus for image stabilization, and a second method, in which the second correcting unit performs image stabilization with a correction ratio greater than that of the first correcting unit.

16. A control method of a lens apparatus that includes a correcting unit performing image stabilization and is attachable to and detachable from an image pickup apparatus, the control method comprising:

a correcting step for performing image stabilization by the correcting unit using output of at least one of a first detector, which detects shake applied to the lens apparatus, and a second detector, which detects shake from an image captured by an image sensor; and an adjusting step for adjusting whether to perform image stabilization based on a correction effect of the correcting unit when use of the output of the second detector for image stabilization is restricted.

17. A control method of a lens apparatus that includes a correcting unit performing image stabilization and is attachable to and detachable from an image pickup apparatus, the control method comprising:

a correcting step for performing image stabilization by the correcting unit using output of at least one of a first detector, which detects shake applied to the lens apparatus, and a second detector, which detects shake from an image captured by an image sensor; and an adjusting step for adjusting a correction ratio of the correcting unit based on whether use of the output of the second detector for image stabilization is restricted.

* * * * *